D. S. DE LAVAUD.
CENTRIFUGAL CASTING.
APPLICATION FILED MAR. 29, 1918.
1,293,049.
Patented Feb. 4, 1919.
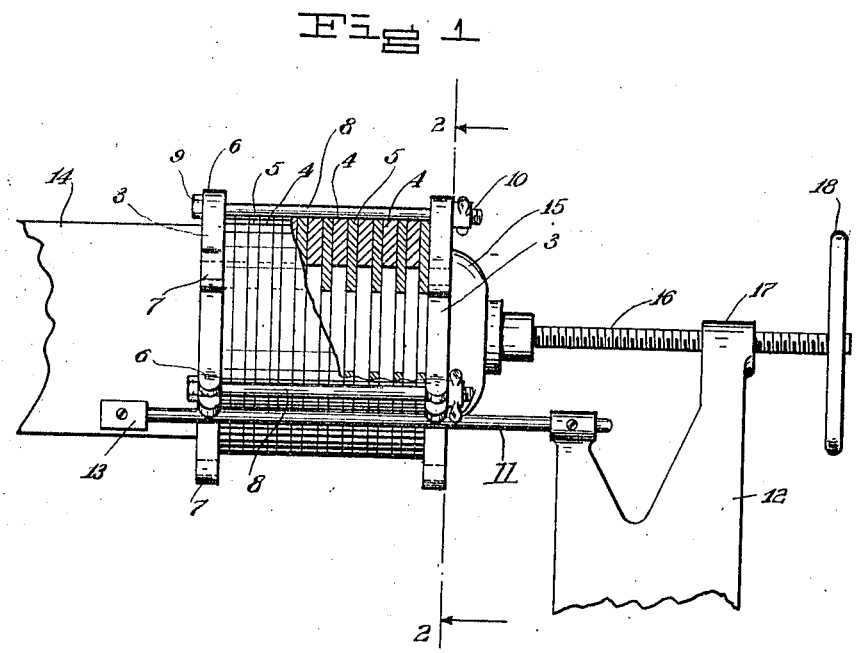
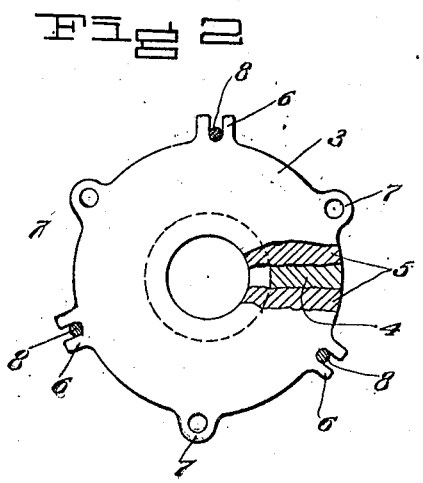
INVENTOR.
Dimitri Sensaud de Lavaud
BY
Augustus M Henry
ATTORNEYS.

UNITED STATES PATENT OFFICE.

DIMITRI SENSAUD DE LAVAUD, OF NEW YORK, N. Y.

CENTRIFUGAL CASTING.

1,293,049.　　　Specification of Letters Patent.　　Patented Feb. 4, 1919.

Application filed March 29, 1918. Serial No. 225,389.

*To all whom it may concern:*

Be it known that I, DIMITRI SENSAUD DE LAVAUD, a citizen of the United States of Brazil, and a resident of New York, in the county of New York and State of New York, have invented certain new and useful Improvements in Centrifugal Castings, of which the following is a specification.

This invention relates to improvements in centrifugal casting, and more particularly aims to provide improvements in rapid-production processes and machines for casting annular members, as piston-rings, in groups.

The present invention has for its principal object the provision of a novel form of multiple-casting mold for casting the articles in groups, and a novel process of assembling this mold when forming the same of a plurality of component parts, a great many of which are preferably duplicates. The invention shows one type of such mold which may advantageously be employed in a centrifugal machine according to the invention of my copending application, Serial No. 236,009 filed May 22, 1918. The novel form of mold of the present invention is here specifically claimed, but more broadly claimed in such copending application, a division of the present application.

The invention will be more clearly understood from the following description, when taken in connection with the accompanying drawings, illustrating a preferred embodiment of the invention.

In these drawings,

Figure 1 is a side elevation of the multiple-casting mold just after assembly, showing, also, an apparatus which may be employed to facilitate carrying out the process; and Fig. 2 is a transverse section taken on the line 2—2 of Fig. 1, with certain of the parts removed.

The mold here shown comprises a pair of duplicate end-rings or end-plates 3, and a series of intermediate alternately arranged thicker mold rings 4, hereinafter referred to as the periphery molds, since they are to form the outer peripheries of the cast articles and thinner mold rings 5, hereinafter referred to as side molds, since they are to form the sides of the cast articles. Except for the provision on the end-plates 3, of the alternately arranged offset extension 6 and 7, the end-rings 3 and the mold-rings 4 and 5 are of a common external diameter. The extensions 6 are provided with openings, open-mouthed at their outer ends, and the extensions 7 are provided with openings of circular cross-section as shown. These openings in the extensions 7 may be employed for mounting the mold when assembled on a rotor as described in the copending application above identified.

The openings in the extensions 6 are provided for the insertion therein of the tie-lengths of a plurality of longitudinal tie-elements or bolts 8 having terminal enlargements 9 and 10. These terminal enlargements in the present case are constituted by the bolt-heads and by the nuts illustrated. In order to permit the stack of end-plates and mold-rings to be assembled readily and easily, in preparation for the addition of the tie-elements, the assembly apparatus comprises a pair of fixed horizontal and parallel guide rods 11, anchored at their opposite ends in fixed blocks 12 and 13, and so disposed that when two of the exensions 6 of each end-plate 3 span the guide rods and the mold-rings are set on the guide rods at points on their peripheries, all the ring elements are concentric and the openings in the extensions 6 and 7 of the two end-plates are alined. In order to permit the tie-elements to be quickly and easily engaged with the extensions 6, and yet to permit these tie-elements subsequently to hold all parts of the mold interlocked as one unit, the assembling apparatus further comprises a fixed abutment 14, and in line therewith a movable presser-block 15. This presser-block is supported at one end of a screw 16, threaded through a fixed sleeve 17, and carrying at its other end a hand wheel 18. Preferably the presser-block 15 is connected to the adjacent end of the screw 16 in a suitable manner (not shown) so that the screw may be rotated relative to the presser-block, thereby to permit spiral adjustment of the screw to advance the presser block axially of the mold. The presser-block is thus advanced sufficiently to compress the stack of end-plates and mold-rings to a slightly greater extent than the extent relied on to hold the end-plates and mold-rings connected when the fully assembled mold is released and removed from the assembly apparatus. Such a compression of the stack permits the tie-elements to be set in place in the openings in the extensions 6 very quickly and easily.

It will thus be seen that the process of the present invention comprises the stacking of a plurality of alternately arranged periphery and side molds, subjecting the molds to axial pressure to reduce the length of the stack to less than the normal length of the stack, then securing the molds together to be held in the stack, by mutual face-pressure and then, before releasing said axial pressure, tying the stack of molds together by means of end-plates or end-rings and separable longitudinal tie-elements coupling the end-plates.

I claim:

1. A multiple-casting mold mountable on and demountable from a supporting rotor of a centrifugal casting machine, for casting simultaneously a group of disconnected parallelly disposed annular articles, said mold comprising a plurality of concentric alternately arranged periphery mold-rings and side-surface mold rings, and securing means comprising two end-rings and tie-elements running longitudinally of the mold so proportioned and arranged as to cause adjacent mold-rings to exert face pressures relative each other, wherein certain of said rings have transverse slots each open mouthed adjacent to the outer periphery of its ring, into which the tie-elements may be set.

2. The art of assembling a plurality of mold-rings in axial alinement between two end-rings, by means of separable longitudinal tie-elements adapted to be engaged with coacting elements carried by the end-rings, thereby to provide a portable unitary multiple-casting mold, which consists in assembling between the end-rings a plurality of side-by-side arranged mold-rings, subjecting the rings to axial pressure to reduce the length of the column to less than the normal length of the column when the tie-elements are engaged with said coacting elements, then thus engaging the tie-elements, and then releasing said pressure.

3. The art of assembling a plurality of mold-rings in axial alinement between two end-rings, by means of separable longitudinal tie-elements adapted to be engaged with coacting elements carried by the end-rings, thereby to provide a portable unitary multiple-casting mold, which consists in assembling between the end-rings a plurality of side-by-side arranged mold-rings, by supporting and positioning two corresponding points on the outer periphery of each ring and below the center of the ring so that two series of corresponding points on all the rings are alined parallelly, subjecting the rings to axial pressure to reduce the length of the column to less than the normal length of the column when the tie-elements are engaged with said coacting elements, then thus engaging the tie-elements, and then releasing said pressure.

4. A mold as described in claim 1, wherein each tie-element is a rod-like member having enlargements at opposite ends, the two enlargements being locked into predetermined spaced relation longitudinally of the tie-elements to assemble the mold.

5. A mold as described in claim 4, wherein one of the enlargements on each tie-element is adjustable relative to the other to vary said spaced relation between the two enlargements on that tie-element to adapt the tie-element for utilization in a multiple-casting mold comprising a predetermined number of mold-rings.

Signed at New York, in the county of New York and State of New York this 28 day of March, A. D. 1918.

DIMITRI SENSAUD DE LAVAUD.